US008090200B2

(12) United States Patent
Barletta et al.

(10) Patent No.: US 8,090,200 B2
(45) Date of Patent: Jan. 3, 2012

(54) REDUNDANCY ELIMINATION IN A CONTENT-ADAPTIVE VIDEO PREVIEW SYSTEM

(75) Inventors: Antonio Barletta, Stuttgart (DE); Boris Moser, Walheim (DE); Matthias Mayer, Karlsruhe (DE)

(73) Assignee: Sony Deutschland GmbH, Cologne (DE)

( * ) Notice: Subject to any disclaimer, the term of this patent is extended or adjusted under 35 U.S.C. 154(b) by 864 days.

(21) Appl. No.: 11/042,670

(22) Filed: Jan. 25, 2005

(65) Prior Publication Data
US 2005/0200762 A1 Sep. 15, 2005

(30) Foreign Application Priority Data
Jan. 26, 2004 (EP) .................................. 04001614

(51) Int. Cl.
*G06K 9/00* (2006.01)
*G06K 9/34* (2006.01)
(52) U.S. Cl. ....................................... 382/168; 382/173
(58) Field of Classification Search .................. None
See application file for complete search history.

(56) References Cited

U.S. PATENT DOCUMENTS 5,592,226 A * 1/1997 Lee et al. .................. 375/240.14
5,635,982 A * 6/1997 Zhang et al. ............. 348/231.99
5,708,767 A * 1/1998 Yeo et al. ....................... 345/440
5,754,728 A * 5/1998 Nakajima et al. ............... 386/68

(Continued)

FOREIGN PATENT DOCUMENTS
EP 0 690 413 1/1996
EP 1 133 191 9/2001

OTHER PUBLICATIONS

Hanjalic, "Shot-Boundary Dectection: Unraveled and Resolved?", IEEE Trans. Circuits and Systems for Video Technology, vol. 12, No. 2, Feb. 2002.*

(Continued)

*Primary Examiner* — Yuzhen Ge
(74) *Attorney, Agent, or Firm* — Oblon, Spivak, McClelland, Maier & Neustadt, L.L.P.

(57) ABSTRACT

A content-adaptive video preview system (100) allows to go faster through a video than existing video skimming techniques. Thereby, a user can interactively adapt (S1) the speed of browsing and/or the abstraction level of presentation. According to one embodiment of the invention, this adaptation procedure (S1) is realized by the following steps: First, differences between precalculated spatial color histograms associated with chronologically subsequent pairs of video frames said video file is composed of are calculated (S1*a*). Then, these differences and/or a cumulative difference value representing the sum of these differences are compared (S1*b*) to a predefined redundancy threshold (S(t)). In case differences in the color histograms of particular video frames (302*a-c*) and/or said cumulative difference value exceed this redundancy threshold (S(t)), these video frames are selected (S1*c*) for the preview. Intermediate video frames (304*a-d*) are removed and/or inserted (S1*d*) between each pair of selected chronologically subsequent video frames depending on the selected abstraction level of presentation. Thereby, said redundancy threshold value (S(t)) can be adapted (S1*b'*) for changing the speed of browsing and/or the abstraction level of presentation.

16 Claims, 4 Drawing Sheets

U.S. PATENT DOCUMENTS

| | | | | |
|---|---|---|---|---|
| 5,911,008 A * | 6/1999 | Niikura et al. | | 382/236 |
| 5,956,026 A * | 9/1999 | Ratakonda | | 715/723 |
| 5,995,095 A * | 11/1999 | Ratakonda | | 715/255 |
| 6,075,875 A * | 6/2000 | Gu | | 382/107 |
| 6,195,458 B1 * | 2/2001 | Warnick et al. | | 382/173 |
| 6,278,446 B1 * | 8/2001 | Liou et al. | | 715/700 |
| 6,393,054 B1 * | 5/2002 | Altunbasak et al. | | 375/240 |
| 6,424,789 B1 * | 7/2002 | Abdel-Mottaleb | | 386/52 |
| 6,501,856 B2 * | 12/2002 | Kuwano et al. | | 382/194 |
| 6,535,639 B1 * | 3/2003 | Uchihachi et al. | | 382/225 |
| 6,549,643 B1 * | 4/2003 | Toklu et al. | | 382/107 |
| 6,720,979 B1 * | 4/2004 | Shrader | | 715/723 |
| 6,744,922 B1 * | 6/2004 | Walker | | 382/190 |
| 6,760,536 B1 * | 7/2004 | Amir et al. | | 386/68 |
| 6,804,294 B1 * | 10/2004 | Hartung et al. | | 375/240 |
| 6,870,956 B2 * | 3/2005 | Qi et al. | | 382/170 |
| 6,912,327 B1 * | 6/2005 | Hori et al. | | 382/305 |
| 6,957,387 B2 * | 10/2005 | Barbieri | | 715/719 |
| 7,110,454 B1 * | 9/2006 | Chakraborty | | 375/240.16 |
| 7,177,470 B2 * | 2/2007 | Jasinschi et al. | | 382/170 |
| 2001/0033693 A1 * | 10/2001 | Seol et al. | | 382/219 |
| 2002/0069218 A1 | 6/2002 | Sull et al. | | |
| 2003/0123541 A1 * | 7/2003 | Jun et al. | | 375/240.08 |
| 2004/0125877 A1 * | 7/2004 | Chang et al. | | 375/240.28 |

OTHER PUBLICATIONS

Niblack et al, "Web-Based Searching and Browsing of Multimedia Data", ICME 2000. 2000 IEEE International Conference on Multimedia and Expo, Publication Date: 2000.*

Christel, M.G., et al., "Adjustable Filmstrips and Skims as Abstraction for Digital Video Library" (IEEE Advances in Digital Libraries Conference, Baltimore, MD, May 19-21, 1999.

Smith, M.A., et al., "Video Skimming for Quick Browsing based on Audio and Image Characterization" (School of Computer Science, Carnegie Mellon University, Pittsburgh, PA, Jul. 30, 1995, CMU-CS-95-186).

Zhang, D., et al., "A New Shot Boundary Detection Algorithm" (Microsoft Research, China), Lecture Notes in Computer Science, vol. 2195, 2001.

Girgensohn, A., et al., "Time-Constrained Keyframe Selection Technique" (Multimedia Tools and Applications, vol. 11, No. 3, Aug. 2000, pp. 347-358 ).

Rafael C. Gonzalez, et al., "Digital Image Processing, Second Edition", ISBN: 0-13-094650-8, 2002, 413 Pages.

* cited by examiner

REDUNDANCY ELIMINATION IN A CONTENT-ADAPTIVE VIDEO PREVIEW SYSTEM

FIELD AND BACKGROUND OF THE INVENTION

The present invention generally relates to the field of fast multimedia browsing. It particularly refers to different implementations of a video preview system.

Nowadays, the emergence of high volume multimedia archives has shown a clear need for an efficient content-specific multimedia browsing technology providing means for extracting relevant information. To avoid information overload, a browsing system needs to preselect shots of information from a database in a user-adequate manner. Additionally, such a browsing system should be able to support continuous presentation of time-dependent media. Users of browsing applications often have vague information needs which can only be described in conceptual terms. Additionally, a general browsing system must offer mechanisms for interactive inspection of the presented information following a user's instructions.

BRIEF DESCRIPTION OF THE PRESENT STATE OF THE ART

There are VCR-like tools enabling a fast-forwarding (and other trick play techniques offered by a digital video cassette recorder), whereby a video is played back in a higher frame rate (normally two, four or eight times as fast as the original frame rate) in order to go quickly through the video materials and to preserve the dynamic flow of a story.

The base technology developed under Informedia-I combines speech, image and natural language understanding to automatically transcribe, segment and index linear video for intelligent search and image retrieval. Informedia-II seeks to improve the dynamic extraction, summarization, visualization and presentation of distributed video by automatically producing "collages" and "auto-documentaries" that summarize documents from text, images, audio and video into one single abstraction (see "Adjustable FilmStrips and Skims as Abstraction for Digital Video Library" (IEEE Advances in Digital Libraries Conference, Baltimore, Md., May 19-21, 1999, http://www.informedia.cs.cmu.edu/documents/adl99.pdf) by M. G. Christel, A. G. Hauptmann, A. S. Warmack, and S. A. Crosby and http://www.informedia.cs.cmu.edu/).

The fast video playback view of the CueVideo/MediaStart project described in http://www.almaden.ibm.com/projects/cuevideo.shtml (IBM Almaden Research Center) comprises a new video stream which is composed of sub-sampled frames from the original video, while taking the amount of motion into account.

As described in "Digital Image Processing" (Prentice Hall International Editions, Second Edition, 2002, ISBN 0-13-094650-8) by R. C. Gonzales and R. E. Woods, color histograms are used to enhance digital images. Furthermore, a common measurement for indicating shot boundaries is the color spectrum of frames. With the help of color histograms, pairs of frames are compared and shot boundaries can be detected. In addition, for reducing the computing complexity color histograms are converted to gray scale or an adequate subset of the colors is selected (see "A New Shot Boundary Detection Algorithm" (Microsoft Research, China) by D. Zhan, W. Qi, and H. J. Zhang, "Time-Constrained Keyframe Selection Technique" (FX Palo Alto Laboratory) by A. Girgensohn and J. Boreczky, and "Video Skimming for Quick Browsing based on Audio and Image Characterization" (School of Computer Science, Carnegie Mellon University) by M. A. Smith and T. Kanade).

The herein proposed techniques for a selection or removal of content can be grouped as follows:

Traditional fast-forward: Video frames for the preview are selected equidistantly (e.g. each n-th frame), and frames between selected frames are dropped. As a result, the content is viewed faster, but there is a high risk that frames are removed which are important for the perception of the content, which means that non-redundant visual content is removed. (Example: Fast parts are viewed too fast, slow parts could be viewed even faster.)

Semantic approaches: Video content is selected or removed in a semantic manner. The problem is that a video has to be known to determine relevant or non-relevant parts. Furthermore, the complexity of the video analysis is very high.

When color histograms are used to detect shot boundaries, differences of the color histograms of adjacent frames are calculated and finally compared to a heuristically found threshold. If the difference exceeds this threshold, it is assumed that a shot boundary is found. A disadvantage is that this threshold is optimized to detect shot boundaries, but not sufficient to detect changes of frames inside shots. When color histograms are applied, the color space is transformed to a gray scale or only certain colors are selected to reduce the calculation effort. A disadvantage is that the color distribution of a specific image has to be known very well (image analysis) to get good gray scale conversions or color selections.

In their article "Time-Constrained Keyframe Selection Technique" (in: Multimedia Tools and Applications, 11, pp. 347-358, 2000) the authors A. Girgensohn and J. Boreczky describe a novel technique for selecting keyframes based on image similarity which is able to produce a variable number of keyframes that meet various temporal constraints. Thereby, a hierarchical clustering approach is applied that can determine exactly as many clusters as requested keyframes. Temporal constraints determine which representative frame from each cluster is chosen as a keyframe. The detection of features such as slide images and close-ups of people is used to modify the clustering of frames to emphasize keyframes with desirable features. This approach has been applied to a large number of videos producing keyframes similar to the ones chosen by hand. The herein proposed keyframe extraction approach is also used to create visual summaries of videos in different layouts.

A further video browsing technique that allows to automatically create video browsing data incorporating content-specific audio and video information is described in the article "Video Skimming for Quick Browsing based on Audio and Image Characterization" (School of Computer Science, Carnegie Mellon University, Pittsburgh, Pa., Jul. 30, 1995, CMU-CS-95-186) by M. A. Smith and T. Kanade. Therein, the authors propose a method to extract significant audio and video information and create a "skim video" which represents a short synopsis of an original video sequence. The extraction of significant information, such as specific objects, audio keywords and relevant video structure, is made possible through the integration of techniques in image and language understanding. The skimmed video is much smaller and retains the essential content of the original video sequence.

U.S. Pat. No. 5,708,767 describes a method and an apparatus for video browsing based on content and structure. Therein, a new browsing technique for extracting a hierarchical decomposition of a complex video selection is proposed, which combines visual and temporal information to capture the most important relations within a scene and between different scenes in a video, thus allowing an analysis of the underlying story structure without having a priori knowledge of the content.

In U.S. Pat. No. 5,995,095, a method for hierarchical summarization and browsing of digital video is disclosed which comprises the steps of inputting a digital video signal for a digital video sequence and generating a hierarchical summary that is based on keyframes of said video sequence.

An automatic video summarization technique using a measure of shot importance as well as a frame-packing method are described in U.S. Pat. No. 6,535,639.

In WO 00/39707 a personalized video classification and retrieval system is disclosed that allows users to quickly and easily select and receive stories of interest from a video stream.

A video-on-demand (VoD) system as well as a corresponding method for performing variable speed scanning or browsing are described in EP 0 676 878 A1.

U.S. 2002/0051010 refers to a system for searching and browsing multimedia and, more particularly, to a video skimming method and apparatus which is capable of summarizing the full content of video files within a short period of time by skimming the content of a video file and rapidly moving to a desired section.

EP 1 205 898 A2 pertains to computer-implemented techniques for improving reading proficiency. Thereby, a segment of text is displayed on a video screen.

GB 2 322 225 is directed to a continuous search method and apparatus for searching among discontinuously recorded sheets of photo information, which are recorded in a digital recording medium (e.g. a digital video cassette recorder).

U.S. Pat. No. 5,847,703 refers to a method and apparatus for browsing through a motion picture in order to locate desired segments in said motion picture.

A method carried out in an image processing system for selecting text and image data from video images is disclosed in U.S. Pat. No. 6,178,270.

PROBLEMS TO BE SOLVED BY THE INVENTION

Today, the increasing amount of digital multimedia content (video, audio, and text data from movies, Web pages, e-books, audio and video files, etc.) is opening up a vast range of problems and challenges related to the consumption of multimedia content. One of the major problems is how to quickly browse through these digital multimedia content for getting an impression or a digest of the contained information in a short time since browsing and digesting digital multimedia content is generally very time-consuming. Therefore, preprocessed previews are usually offered to all users. Up to now, however, most of the presently available automatic or semi-automatic video summary systems feature many limitations:

- poor computer-based user interactions and use of non-intuitive GUI paradigms,
- high computational complexity (especially when complex extraction algorithms are applied, which are often restricted to a specific content type),
- focus on either preview or digest,
- too long preview time, and
- poor modeling of user preferences.

The problem of all these concepts is that the removal of visual redundancy is still not optimally solved.

OBJECT OF THE PRESENT INVENTION

In view of the explanations mentioned above, it is the object of the invention to provide for technique for enabling an efficient way of previewing digital video content. The intention is to convey a real impression of an unknown video content in a short time without visually overloading a user.

This object is achieved by means of the features of the independent claims. Advantageous features are defined in the subordinate claims. Further objects and advantages of the invention are apparent in the detailed description which follows.

SUMMARY OF THE INVENTION

The invention is dedicated to a content-adaptive video preview system for efficiently browsing the content of requested video data to be previewed and a corresponding method for reducing the visual redundancy of video content, which allows a user to go faster through a video than existing video skimming techniques without reducing the loss of information. Thereby, a user can interactively set the "granularity" of the preview, which means the abstraction/detail level of presentation.

For previewing or fast-forwarding digital multimedia data it is important to know how presented frames are selected or at which positions a video preview is continued. The proposed video preview system uses differences between neighboring video frames to select specific frames for the preview based on a predefined redundancy threshold. This allows a user to quickly preview a video while keeping the control over content to be previewed and the speed of browsing. Differences can be detected e.g. in the color or audio spectrum, in the spatial configuration of pixels or regarding moving objects and motion of complete scenes. Dependent on a threshold the differences of the frames are compared to, video frames are selected and redundancy is removed. Furthermore, the adjustability of this threshold affects the selection of the video frames. This means that with a lower threshold more video frames are selected than with a higher threshold. As a result a video can be previewed fast or slowly. Since the continuation is given by the differences of frames, one of the characteristics of this system is that fast changing content is passed on slowly and slowly changing content is passed on fast.

For calculating these differences, a method using color histograms is introduced which goes beyond the traditional usage of color histograms for shot detection to improve the selection of video frames even inside shots.

Said video preview system can e.g. be realized as a video-on-demand system with an additional video browsing functionality for varying the speed and detail level of presentation depending on user commands instructing the video preview system to change the speed of browsing such that said detail level is the higher the lower the speed of presentation and vice versa.

One possible implementation of the proposed multimedia preview system works by decomposing the content of e.g. a digital video or audio file, assigning segmented parts of said content to different speeds of browsing representing different levels of detail and controlling the speed of browsing. It is important to note that—in contrast to WO 00/39707 and U.S. 2002/0051010—the proposed video preview system according to the present invention does not depend on semantic analysis tools such as shot and scene detection means. Instead, said file is temporally compressed by cutting out several parts of a video sequence, and the speed of scrolling the visualized information can be controlled by a user. The intention of the proposed system is to give the user an impression of the content without trying to 'hide' uninteresting parts such that the user can decide by himself whether said content is interesting or not.

BRIEF DESCRIPTION OF THE DRAWINGS

Further advantages and embodiments of the present invention result from the subordinate claims as well as from the following detailed description of the invention as depicted in the accompanying drawings:

DETAILED DESCRIPTION OF THE PRESENT INVENTION

Figure 1:
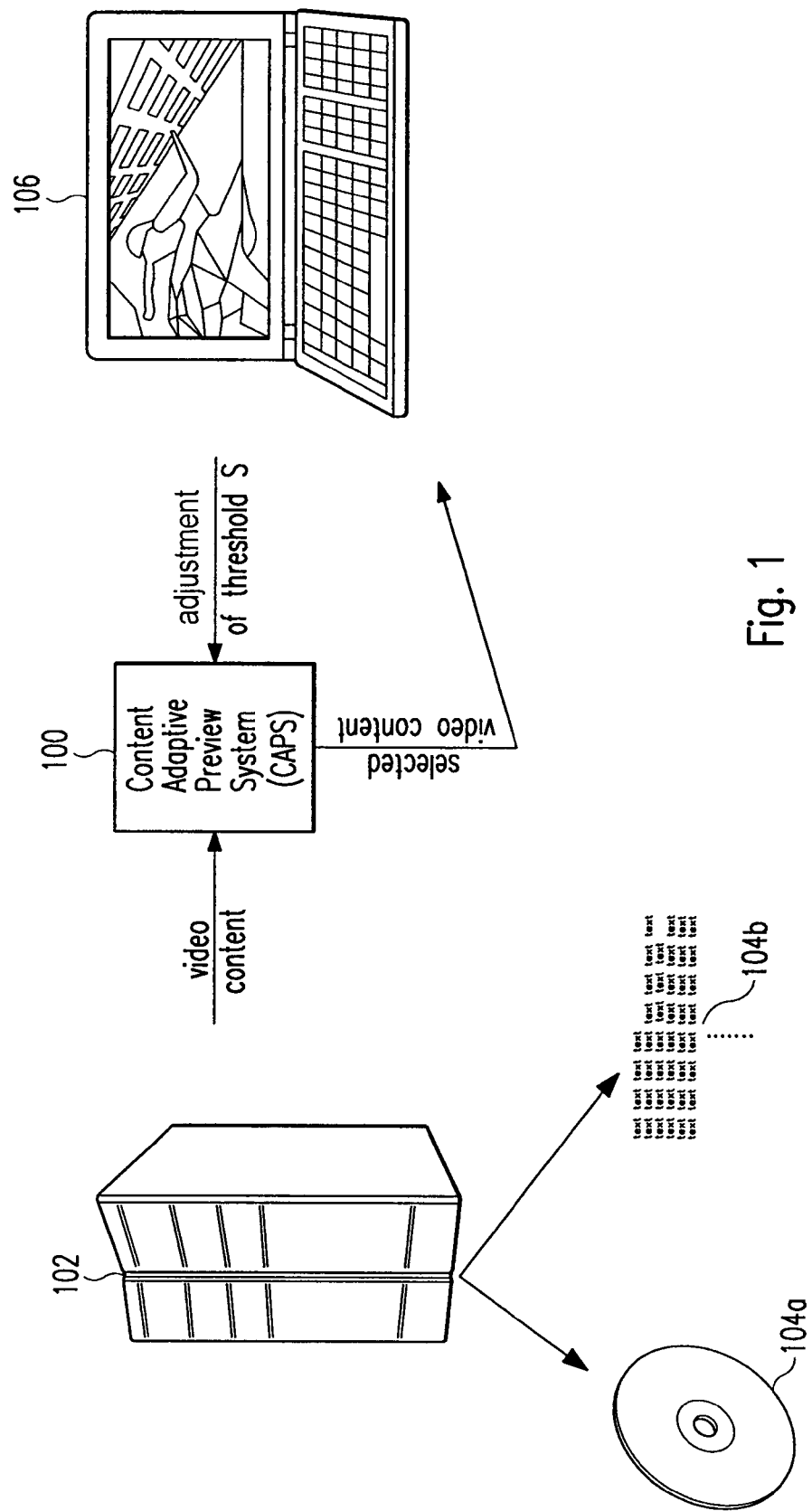
FIG. 1 is a block diagram showing the content-adaptive preview system (CAPS) according to the present invention.

In the following, embodiments of the present invention as depicted in FIGS. 1 to 7 shall be explained in detail. The meaning of all the symbols designated with reference numerals and signs in FIGS. 1 to 7 can be taken from an annexed table.

FIG. 1 shows the proposed video preview system 100 according to one embodiment of the invention in a client/server-based network environment for browsing the content of requested video files to be previewed, wherein said content is displayed on a client terminal 106 accessing a multimedia server 102 which holds said video files. Said video preview system comprises controlling means 106a for adapting the speed of browsing and/or the abstraction level of presentation. This is achieved by eliminating redundant content in chronologically subsequent video frames said video file is composed of, replicating and/or interpolating particular video frames depending on user commands instructing the video preview system 100 to either quicker or slower browse through the content of said video files. Thereby, the degree of presented details is the higher the lower the speed of presentation and vice versa.

Said video preview system 100 is realized as a video-on-demand system with an additional video browsing functionality for varying the speed and detail level of presentation depending on said user commands.

A further embodiment of the invention pertains to a method for browsing the content of a requested video file to be previewed and adapting (S1) the speed of browsing and/or the abstraction level of presentation by eliminating redundant content in chronologically subsequent video frames. Said adaptation (S1) is thereby realized by the following steps: First, differences between precalculated spatial color histograms associated with chronologically subsequent pairs of video frames said video file is composed of are calculated (S1a). Then, these differences and/or a cumulative difference value representing the sum thereof are compared (S1b) to a predefined redundancy threshold S(t). In case differences in the color histograms of particular video frames 302a-c and/or said cumulative difference value exceed this redundancy threshold S(t), these video frames are selected (S1c) for the preview. Intermediate video frames 304a-d are removed and/or inserted (S1d) between each pair of selected chronologically subsequent video frames depending on the selected abstraction level of presentation given by the redundancy threshold S(t). Thereby, said redundancy threshold value S(t) can be adapted (S1b') for changing the speed of browsing and/or the abstraction level of presentation.

For allowing users to identify segmented parts of video files to be previewed, metadata of any kind can be associated (S2a) and synchronized (S2b) to said video files.

Figure 2:
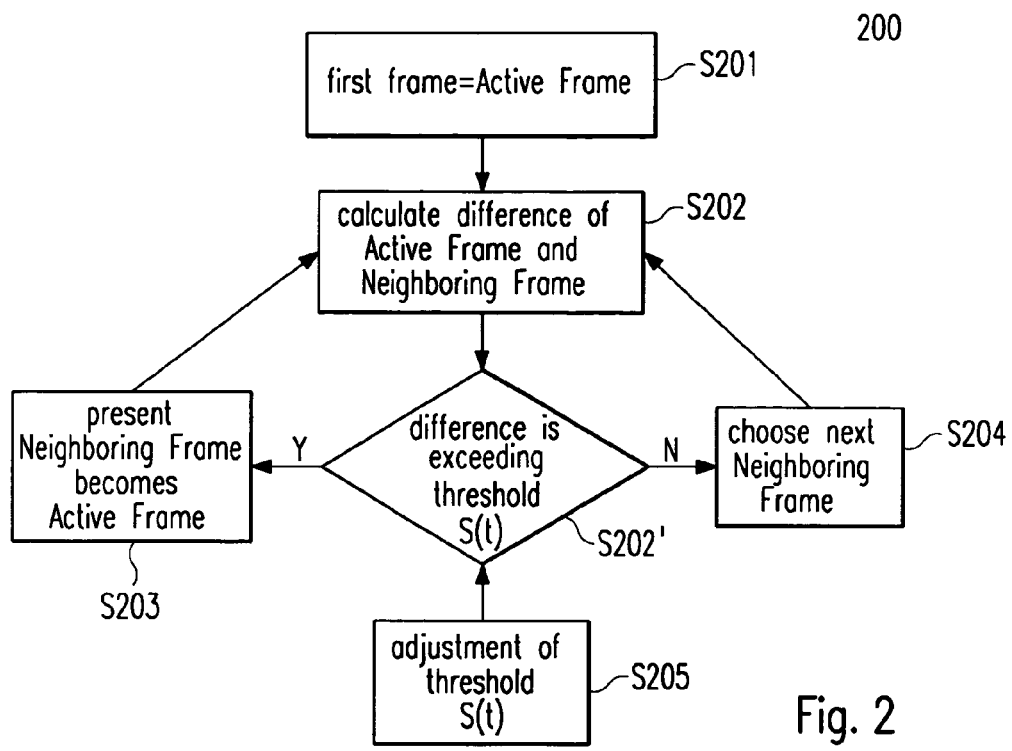
FIG. 2 is a flow chart illustrating the core algorithm according to the present invention.

As depicted in FIG. 2, the content-adaptive video preview system according to the present invention uses differences of sequencing video frames to select the video frames to be previewed. These differences can be detected e.g. in the color or audio spectrum, the spatial configuration of pixels, moving objects and in the motion of complete scenes. Dependent on a redundancy threshold, the differences of said frames are compared, particular frames are selected, and thus redundancy is removed. Furthermore, the adjustability of this threshold affects the selection of video frames. This means that with a lower threshold more video frames are selected than with a higher threshold. As a result, a video can be previewed fast or slowly. Since the continuation is given by the differences of frames, one of the characteristics of the proposed system is that fast changing content is passed on slowly and slowly changing content is passed on fast. Finally, for calculating these differences, a method is introduced that uses color histograms. This method goes beyond the traditional usage of color histograms for shot detection in order to improve the selection of video frames, even inside shots.

For the following detailed description of the applied method, some definitions are needed:
1. Difference: $d(i,j)$ is defined as the content-related difference of frame i and frame j with $i,j \in \{0, 1, 2, \ldots, N-1\}$, wherein N denotes the total number of frames.
2. Redundancy threshold: S is defined as a redundancy threshold value the differences $d(i,j)$ are compared to.
3. Active frame: The "active frame" is a frame of a video that is chosen as a part for a preview and is currently presented to the user.
4. Neighboring frame: The "neighboring frame" is the frame the "active frame" is compared to.
5. "Intermediate frame: The intermediate frame" is a frame that is inserted between two active frames to guarantee a smoother output. The intermediate frame is a part of the preview.

According to one embodiment of the invention, the proposed content-adaptive preview system is specially designed for performing the following method: When the preview of a video has been started with the first frame being the active frame, $$i := 0, \quad (1)$$

the differences $d(i,i+1), d(i,i+2), \ldots, d(i,i+k)$ of the current active frame i and the neighboring frames $i+1, i+2, \ldots i+k$ are calculated until a distance k is found such that the difference between frame i and frame $i+k$ exceeds a predefined redundancy threshold S (see FIG. 2). Then, frame $i+k$ becomes the next active frame:

$$\exists\, k : d(i,i+k) \geq S \Rightarrow \text{Set } i := i+k. \quad (2a)$$

The preview is then continued with the new active frame i and the above process is iterated again. Otherwise, said process is repeated with the next neighboring frame $i+1$ being the active frame:

$$i := i+1. \quad (2b)$$

To vary the video preview, said threshold value S can be adjusted. Consequently, S has to be replaced by a time-variant function S(t). When the threshold is increased (decreased), less (more) frames are selected and the video preview is faster (slower). In the user's view, increasing or decreasing the threshold value S has an immediate effect on the speed of browsing.

Figure 3:
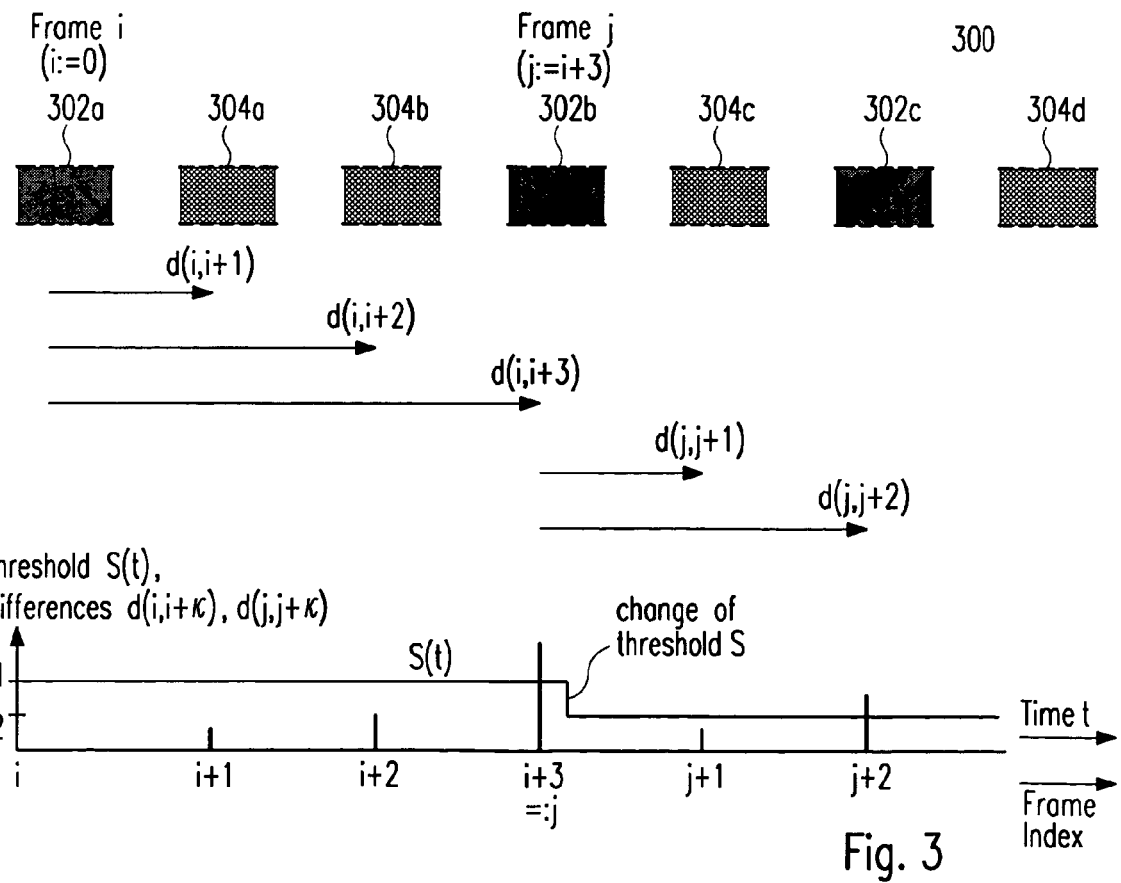
FIG. 3 shows a timing diagram illustrating the difference-based selection of frames.

FIG. 3 depicts a video sequence of contiguous frames and the three calculated differences d(i,i+1), d(i,i+2) and d(i,i+3).

In the first part the threshold function S(t) is set to a constant level S1; in the second part it is set to a smaller level S2. When the video preview arrives at frame i (the current active frame), the three differences d(i,i+1), d(i,i+2) and d(i,i+3) are calculated. The calculation stops with frame i+3 since condition (2a) is fulfilled for k=3:

$$d(i,i+k) \geq S_1 \text{ for } k=3. \tag{3a}$$

Hence, frame i+3 is becoming the new active frame (i:=i+3). Arrived at the new position of the video stream (which means at the new active frame i, in FIG. 3 written as frame j for a better differentiation between the old and the new active frame), the differences between the new active frame j and its neighboring frames are calculated until a frame j+k is found such that the difference between frame j and frame j+k fulfills condition (2a), which is the case for k=2:

$$d(j,j+k) \geq S_2 \text{ for } k=2. \tag{3b}$$

This means that the two differences d(j,j+1) and d(j,j+2) have to be calculated.

It can be seen in the figure that the threshold function S(t) was set to $S_2$. Since the difference d(j,j+2) is bigger than $S_2$ but lower than $S_1$ the speed of browsing decreases.

Differences can be detected in the color or audio spectrum, the spatial configuration of pixels, motion of objects or motion vectors of complete frames.

In the following, the description is focused on color histograms.

Histograms are the basis for numerous spatial domain processing techniques. Histogram manipulation can be used for an effective image enhancement. The inherent information in histograms is useful in numerous image processing applications based on image compression and segmentation. Histograms are simple to calculate by software means, thus being a popular tool for real-time image processing as described in "Digital Image Processing" (2002 Second Edition, Prentice Hall International Editions, ISBN 0-13-094650-8) by R. C. Gonzales and R. E. Woods).

According to one embodiment of the invention, this method is applied in the scope of the proposed content-adaptive video preview system but in a different context. The proposed system does not detect shots but chooses frames for fast previewing with the help of histograms. Furthermore, algorithms using region-based, color-channel-based and hybrid color histograms have been developed.

a) Region-Based Color Histograms

The usage of simple color histograms has difficulties to detect changes or differences of frames, especially when motion occurs inside shots. To compensate the disadvantage of normal color histograms, a new method is introduced. This method improves the calculation of differences and helps in the selection of active frames used by the content-adaptive video preview system. Normally, color histograms of complete frames are calculated. Since frames with similar color histograms may have drastically different appearances, a calculation of color histograms of regions of frames helps to partly express the spatial configuration of pixels, especially when motion occurs. In this case, frames are segmented into a certain number of regions. Then, color histograms of the regions are calculated and compared. Additionally, these regions can be weighted to emphasize specific parts of the frames.

In the following case, two frames (i and j), shall be compared. Both frames are segmented into M regions of equal size and location. Then, color histograms are calculated for the M regions of both frames and the corresponding color histograms are compared. The total difference d(i,j) can then be calculated as follows:

The difference d(i,j) is given by the cumulative value of the differences $d_m(i,j)$ of all M regions these frames are composed of:

$$d(i,j) := \sum_{m=0}^{M-1} d_m(i,j). \tag{4a}$$

The difference d(i,j) is the minimal or maximal difference of all M regions:

$$d(i,j) := \min_m d_m(i,j) \text{ or} \tag{4b}$$

$$d(i,j) := \max_m d_m(i,j). \tag{4c}$$

The difference d(i,j) is the average (the arithmetic mean) of the differences of all M regions:

$$d(i,j) := \frac{1}{M} \cdot \sum_{m=0}^{M-1} d_m(i,j). \tag{4d}$$

Figure 4:
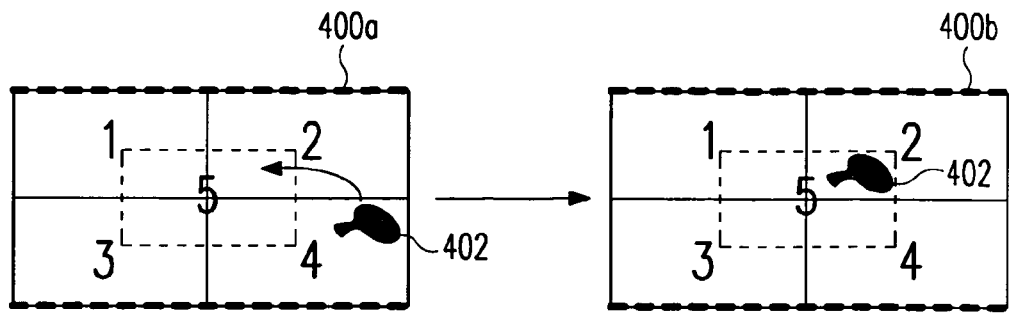
FIG. 4 shows an example of frames that are segmented into five regions for displaying a moving object.

FIG. 4 presents an example of two frames (i and j) showing an object in motion, wherein each of said frames is segmented into five regions. The object moves from the lower right corner to the middle of the respective frame. First the object is covered by region 4 and later by regions 5 and 2. Color histograms of frames that are segmented into regions can detect differences between frames when motion occurs and the color histograms of the complete frame do not indicate any difference. Thus, detection of active frames inside shots is improved.

b) Color-Channel-Based Color Histograms

When color histograms are used, the color space is usually reduced to gray scale, or only certain colors are selected to reduce the calculation effort. A disadvantage is that the color distribution of a specific image has to be known very well (image analysis) to get good gray scale conversions or color selections. According to a new method introduced by the present invention a fast calculation of color histograms is provided which does not perform any conversion of the color space. The step of calculating (S1a) differences d(i,j) between precalculated spatial color histograms $H_i$ and $H_j$ thereby comprises the step of separately calculating (S4a) color histograms ($HR_i$, $HG_i$, $HB_i$ and $HR_j$, $HG_j$, $HB_j$) for each color channel (R,G,B) of the video frames 400a+b to be compared. After that, color histograms associated to the same color channel of said video frames 400a+b are pairwise compared (S4b), wherein $HR_i$ is compared with $HR_j$, $HG_i$ is compared with $HG_j$, and $HB_i$ is compared with $HB_j$, and the differences between these color histograms are calculated (S4c) and accumulated following a certain rule.

c) Region-Based and Color-Channel-Based Histograms

Figure 5:
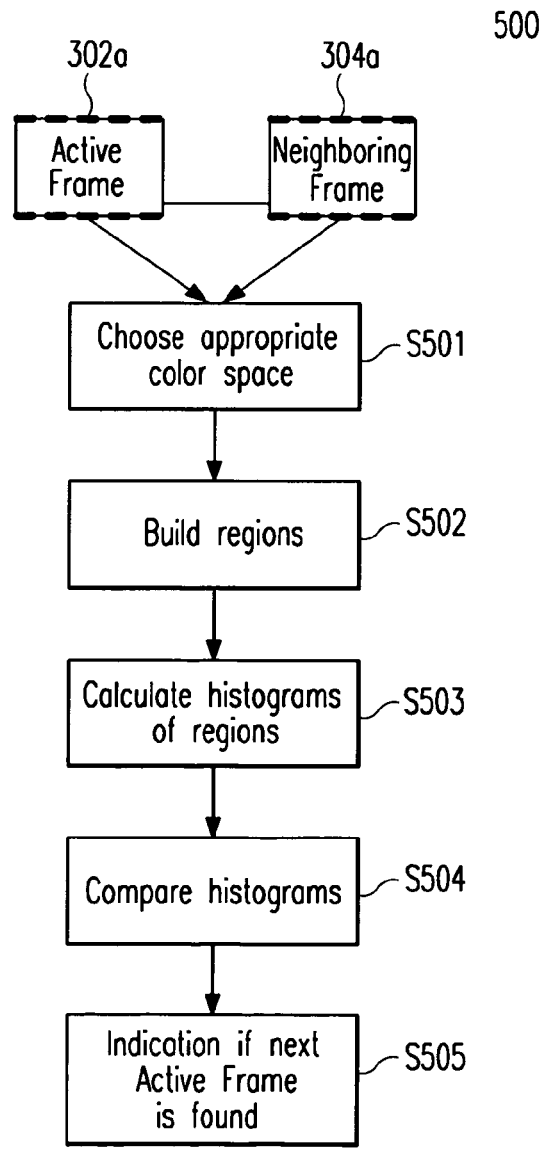
FIG. 5 is a flow chart illustrating the comparison of active frame and neighboring frames by means of color histograms.

Region-based color histograms and color-channel-based color histograms can be combined. There are several ways how frames can be segmented into regions when color channels are used. First, the regions of all color channels are equal. Second, the regions of the color channels are partly different. And third, each color channel has its own segmentation of regions. FIG. 5 depicts the comparison of an active frame and a neighboring frame with the help of color histograms and regions.

According to a further embodiment of the present invention, the step of calculating (S1a) differences d(i,j) between precalculated spatial color histograms $H_i$ and $H_j$ may thus comprise the steps of segmenting (S3a) video frames 400a+b to be compared into a certain number (M) of regions and assigning an index (m) to each region, calculating (S3b) color histograms $H_{im}$ and $H_{jm}$ for the particular regions of said video frames 400a+b, and pairwise comparing (S3c) those regions having the same index and calculating (S3d) the differences between the color histograms $H_{im}$ and $H_{jm}$ of these regions.

There are several ways how the differences can be calculated to find the active frames:

Standard calculation method: For each active frame i the differences d(i,i+1), d(i,i+2), ..., d(i,i+k) are calculated until a distance k is found such that the difference between frame i and frame i+k exceeds a predefined time-variant redundancy threshold S(t). Then, this frame i+k becomes the next active frame (cf. condition (2a)):

$$\exists k : d(i, i+k) \geq S(t) \Rightarrow \text{Set } i := i+k. \tag{5a}$$

According to one embodiment of the present invention, the steps of calculating (S1a) and comparing (S1b) said differences for selecting (S1c) specific video frames for the preview are realized by the following steps: First, for each selected video frame (i) all differences d(i,i+K) between the color histogram $H_i$ of the respectively selected video frame i and the color histograms $H_{i+\kappa}$ of all chronologically subsequent video frames i+κ are calculated (S5a) until a distance k is found such that the difference between the selected video frame i and the corresponding subsequent video frame i+k exceeds a predefined redundancy threshold S(t). This subsequent video frame i+k is then selected (S5b) for the preview.

Accumulative calculation method: For each adjacent pair of frames i+κ and i+κ+1 (with κ∈{0, 1, 2, ..., k−1})

difference images d(i+κ, i+κ+1) are calculated. Then, for each active frame i these differences images are added until a neighboring frame i+k is found for which the content of the respective difference image d(i,i+k) exceeds the time-variant threshold S(t). This frame i+k then becomes the next active frame:

$$\exists k : \sum_{\kappa=0}^{k-1} d(i+\kappa, i+\kappa+1) \geq S(t) \Rightarrow \text{Set } i := i+k. \tag{5b}$$

Thereby, it is expected that for each distance κ the difference d(i,i+κ) is approximately equal to the accumulated difference $$\sum_{\kappa'=0}^{\kappa-1} d(i+\kappa', i+\kappa'+1). \tag{5c}$$

According to a further embodiment of the present invention, differences d(i+κ,i+κ+1) in the color histogram $H_i$ of the respectively selected video frame i and the color histograms $H_{i+\kappa}$ of the immediately chronologically adjacent video frame i+κ are calculated (S6a) for each immediately chronologically adjacent pair of video frames i+κ and i+κ+1. Then, these differences are accumulated (S6b) until a chronologically subsequent video frame i+k is found for which the content of the respective difference image exceeds a predefined redundancy threshold S(t). Finally, this subsequent video frame i+k is selected (S6c) for the preview.

Variations of the frame base: The standard algorithm uses all frames of a digital video in a sequence according to their temporal position in the video. In order to speed up the computation of the active frames and to reduce the computational effort, the following variations about which frames build the basis of the algorithm can be applied.

Subset-based calculation method: The calculation of the differences (normal or accumulative) is not applied to all frames but only to a subset. This means that frames are chosen according to a certain rule. For example, differences are calculated between each n-th frame. The distance n between successive neighboring frames that are compared to the active frame is reduced each time the difference does not exceed the time-variant threshold S(t).

Search-based calculation method: The choice of the neighboring frames is determined in a search-based manner. For example, let frame i be the active frame and frame i+n the first neighboring frame j, which means that the neighboring frames are chosen with the distance n:

$$j := i + n \tag{6a}$$

$$d(i, j) < S(t) \Rightarrow \text{Set } j := i + \ell \cdot n \text{ and} \tag{6b}$$

$$d(i, j) \geq S(t) \Rightarrow \text{Set } j := i + \left\lfloor \frac{1}{\ell} \cdot n \right\rfloor \tag{6c}$$

In the following, let l=2. If the difference d(i,i+n) between frames i and i+n falls below the time-variant threshold S(t), frame i+2n becomes the next neighboring frame. In case the difference exceeds the threshold S(t), frame i+⌊n/2⌋ becomes the next neighboring frame. This process is iterated until a neighboring frame j' is found whose difference d(i,j') to the active frame i is the closest to but greater than the threshold S(t). Thereby, j' is given by as the infimum of a set J of neighboring frame indices j to be calculated according to the equations in conditions (6b) and (6c):

$$j' := \inf_{j \in J} j \text{ with} \tag{6d}$$

$$J := \left\{ j / j := i + n \cdot \ell \text{ for } d(i, j) < S(t), \text{ else } j := i + \left\lfloor \frac{n}{\ell} \right\rfloor \right\} \tag{6e}$$

wherein the initial value for the index j of the neighboring frame can be calculated by equation (6a).

According to one embodiment of the present invention, the steps of calculating (S1a) and comparing (S1b) said differences for selecting (S1c) specific video frames for the preview are thus realized by the following steps to be performed for each selected video frame i: First, an initial distance $$n := n_0 \tag{6f}$$

between the selected video frame i and a new video frame j to be selected for the preview is defined (S7a), wherein said initial distance $n_0$ is given by an integer value greater than one. In case the difference $d(i,j)|_{j=i+n}$ between these two video frames i and j falls below a predefined redundancy threshold S(t), said distance n is multiplied (S7b) with a constant integer factor l, and the obtained result $$n := n \cdot l \tag{6g}$$

is defined (S7b') as a new distance between the selected video frame i and a new video frame j to be selected for the preview. Otherwise, in case the difference $d(i, j)|_{j=i+n}$ between these two video frames i and j exceeds said redundancy threshold S(t), said distance n is divided (S7c) by said factor l, and the obtained result $$n := n/l \tag{6h}$$

rounded down to the nearest integer ⌊n/l⌋ is defined (S7c') as a new distance between the selected video frame i and a new video frame j to be selected for the preview. Then, steps (S7b) and (S7c) are iterated (S7d) until a minimum for said distance n is found such that the aforementioned difference $d(i,j)|_{j=i+n}$ is the smallest difference exceeding said redundancy threshold S(t) among all differences compared with said threshold for a given initial distance $n_0$. In case said initial distance $n_0$ is an integer value greater than one, said initial value is decremented (S7e) by one. After that, steps (S7b), (S7c) and (S7d) are repeated (S7f) until a global minimum for said distance n is found such that said difference $d(i, j)|=_{j=i+n}$ is the smallest difference exceeding said redundancy threshold S(t) among all differences compared with said threshold for all chosen initial distances $n_0$.

Regarding calculation complexity, there are several possibilities to optimize the implementation of the proposed content-adaptive video preview system.

The calculation of the differences and the selection of the active frames are done during runtime. The standard, accumulative, subset-based, and search-based methods can be applied.

The accumulative method can be applied for reducing the calculation complexity during runtime. One way is that a certain amount of precalculated histograms, differences and/or thresholds is stored temporarily in a database of said multimedia server 102. The advantage is that these differences can be reused in case of a rewind and an additional continuation of the video preview, even when the threshold S is changed.

Another way is that for each adjacent pair of frames i and i+1 the differences d(i,i+1) are precalculated. For example, the differences and the video can be stored on the server of a video-on-demand (VoD) system. When the video preview is started, for each active frame the precalculated differences are accumulated until the next active frame is found. After that, the found active frames are combined in real time.

In order to reduce calculation complexity, selected thresholds and the correspondent indices of all found active frames are stored. Thereby, active frames are selected in a difference-based manner by applying anyone of the difference calculation methods introduced above. Dependent on these thresholds, frame indices are read during runtime, and the corresponding active frames are combined.

Furthermore, some previews can be pre-built, wherein these previews are based on different thresholds. The previews are generated with the help of active frames which are selected in a difference-based manner by applying anyone of the difference calculation methods introduced above. During runtime, dependent on the selected threshold, the corresponding pre-built preview is played back. If the threshold changes, the system switches to the corresponding pre-build preview.

The normal output of the proposed content-adaptive video preview system is a series of frames chosen according to a selection function that calculates differences of frames. The lower the threshold the lower the speed of the preview. A video is then viewed in a more fine-grained way such that the video preview looks like moving images since differences between neighboring frames are minimal. By contrast, the higher the threshold the higher the speed, and the video can be previewed in a more coarse-grained way. This means that in case a high threshold is applied, the video preview looks like a slide show.

Figure 6:
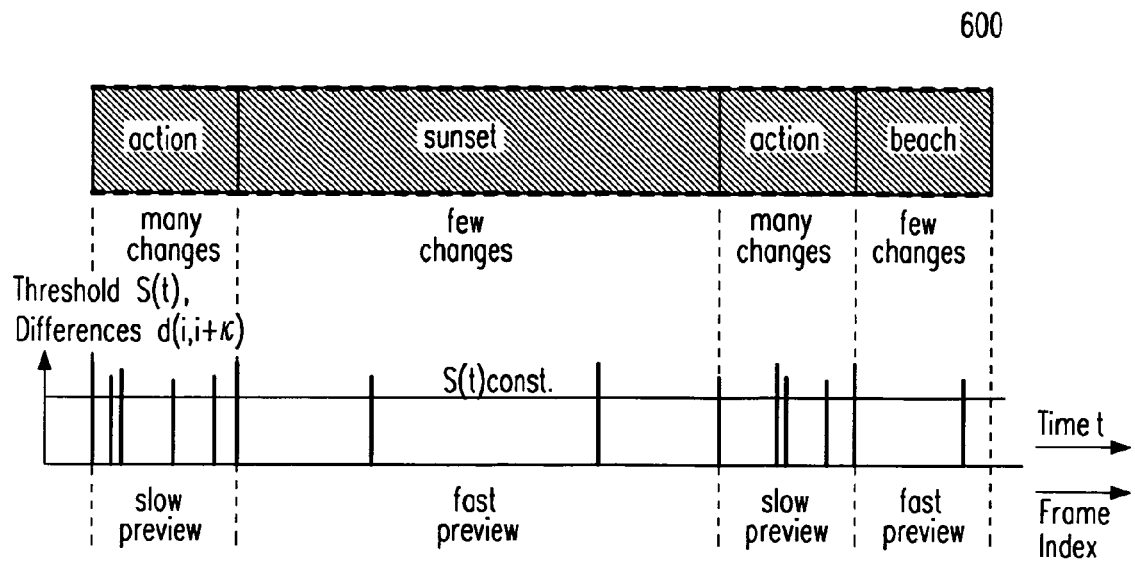
FIG. 6 shows a timing diagram for an example of a content-adaptive video preview.
Figure 7:
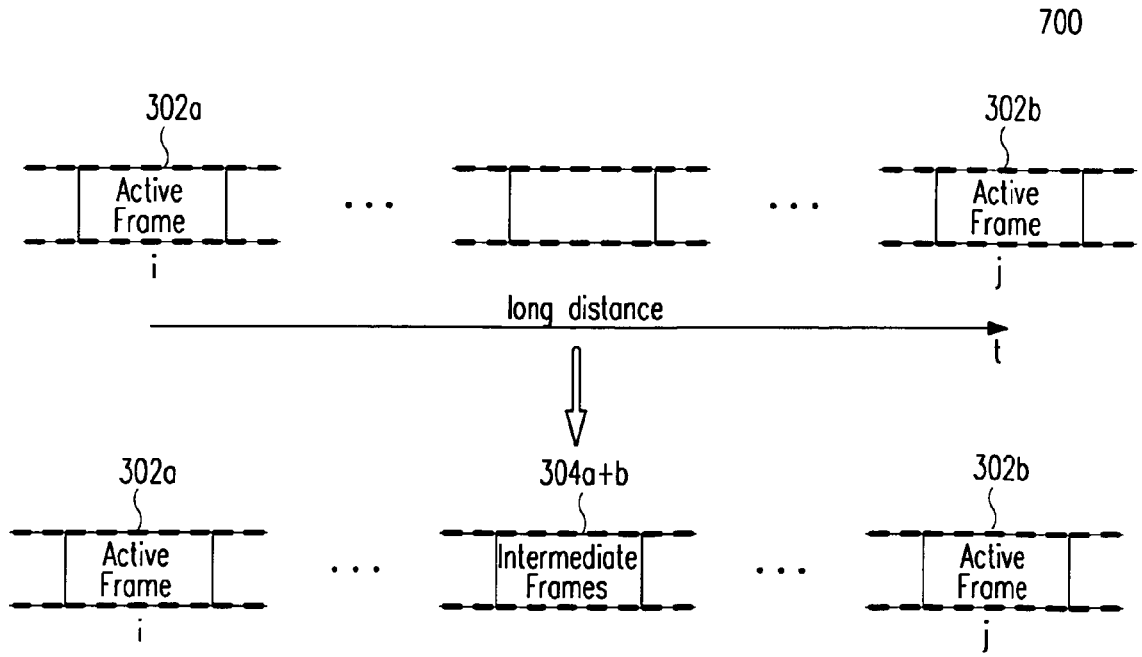
FIG. 7 shows an example illustrating the insertion of intermediate frames.

One characteristic of the proposed content-adaptive preview system is that fast changing content is passed on slowly and slowly changing content is passed on fast. As shown in FIG. 6, redundant or slowly changing content in chronologically subsequent video frames said video file is composed of is eliminated while other video frames containing fast changing content are replicated and/or interpolated depending on user commands instructing the video preview system 100 to either quicker or slower browse through the content of said video files such that the degree of presented details is the higher the lower the speed of presentation and vice versa. Even when the threshold S(t) is kept on the same level, said video preview system detects more active frames in a fast changing content than in a slowly changing content.

If the content contains only little variations (e.g. panorama shots of landscapes) or if the threshold is too high, the distance of the selected active frames becomes too big and the resulting video output could be jittering and nervous. There are several methods for smoothing the output of this preview:

Variation of the frame rate during the preview: Active frames are played with a certain frame rate. Normally, they are played with the standard playback frame rate of the video. Of course, the frame rate is not restricted to that. It is also possible that the frame rate is lower or higher during the complete preview or that the frame rate is variable while the preview is presented. If the distance of active frames is too high, the frame rate could be reduced to slow down the preview.

Variation of the number of intermediate frames: Another way of smoothing the preview can be achieved with the increase of the amount of frames. Additionally to the active frames, intermediate frames can be added to the video preview (see FIG. 7). These intermediate frames can be generated by doubling the number of active frames or by taking frames from the original video source that could be taken from the middle of two active frames or closer to a specific active frame. The position can also be determined in a difference-based manner.

Furthermore, traditional fast-forward techniques can be applied to the output (active frames and intermediate frames) of the content-adaptive video preview system. For example, the use of pre-built previews reduces the interactivity of the system since only the previews for certain threshold are available to the user. The interactivity could be increased again by applying a fast-forward concept with variable speeds. The combination of the proposed content-adaptive video preview system according to the present invention and these techniques represents an efficient way of realizing a content-adaptive and interactive preview system.

Glossary

| Technical Term | Brief Explanation |
| --- | --- |
| Active frame | An active frame is a frame of a video sequence that is chosen as a part for a preview and is currently presented to the user. |
| Neighboring frame | A neighboring frame is a frame the active frame is compared to. |
| Intermediate frame | An intermediate frame is a frame that is inserted between two active frames to guarantee a smoother output. Intermediate frames are a part of the preview. |
| Histogram | The histogram of a digital image with gray levels in the range [0, L − 1] is a discrete function $h(r_k) = n_k$, where $r_k$ is the k-th gray level and $n_k$ is the number of pixels in the image having the gray level $r_k$ (see definition in "Digital Image Processing" (2002 Second Edition, Prentice Hall International Editions, ISBN 0-13-094650-8) by R. C. Gonzales, R. E. Woods) |

Depicted Features and Their Corresponding Reference Signs

| No. | Technical Feature (System Component, Procedure Step) |
| --- | --- |
| 100 | block diagram showing the content-adaptive video preview system |
| 102 | multimedia server in said video-on-demand system 100 for browsing the content of requested video data to be previewed |
| 104a | any data carrier of a file-serving system connected to said multimedia server 102, said file-serving system storing the video data to be previewed |
| 104b | XML-based representation of metadata associated to the content of said video data, used for browsing said video data |
| 106 | client terminal having a display for previewing said video data |
| 106a | controlling means (not shown) for adapting the speed of browsing and/or the abstraction level of presentation in text and/or image |
| 200 | flow chart illustrating the core algorithm according to the present invention |
| 300 | timing diagram illustrating the difference-based selection of active frames 302a – c according to the present invention |
| 400 | example of frames 400a + b that are segmented into five regions for displaying a moving object 402 |
| 500 | flow chart illustrating the comparison of active frames 302a – c and neighboring frames 304a – d by means of color histograms according to the present invention |
| 600 | timing diagram for an example of a content-adaptive video preview |
| 700 | example illustrating the insertion of intermediate frames 304a – d according to the present invention |
| S1 | step #1: adapting said representation parameters by online filtering out (S1') a certain amount of said redundant, less relevant parts depending on type and/or frequency of said user commands |
| S1a | step #1a: calculating differences between precalculated spatial color histograms associated with chronologically subsequent pairs of video frames said video file is composed of |
| S1b | step #1b: comparing these differences and/or a cumulative difference value representing the sum thereof to a predefined redundancy threshold S(t) |
| S1b' | step #1b': adapting said redundancy threshold S(t) for changing the speed of browsing and/or the abstraction level of presentation |
| S1c | step #1c: in case differences in the color histograms of particular video frames and/or said cumulative difference value exceed this redundancy threshold S(t), selecting these video frames for the preview |
| S1d | step #1d: removing and/or inserting intermediate video frames between each pair of selected chronologically subsequent video frames depending on the selected abstraction level of presentation given by the redundancy threshold S(t) |
| S2a | step #2a: associating metadata of any kind allowing users to identify segmented parts of video data to be previewed to said video data |
| S2b | step #2b: synchronizing said metadata with said video data |
| S3a | step #3a: segmenting video frames 400a + b to be compared into a certain number M of regions and assigning an index m to each region |
| S3b | step #3b: calculating color histograms $H_{im}$ and $H_{jm}$ for the particular regions of said video frames 400a + b |
| S3c | step #3c: pairwise comparing those regions having the same index |
| S3d | step #3d: calculating the differences between the color histograms $H_{im}$ and $H_{jm}$ of these regions |
| S4a | step #4a: separately calculating color histograms ($HR_i$, $HG_i$, $HB_i$ and $HR_j$, $HG_j$, $HB_j$) for each color channel (R, G, B) of the video frames 400a + b to be compared |
| S4b | step #4b: pairwise comparing color histograms ($HR_i$ and $HR_j$, $HG_i$ and $HG_j$, $HB_i$ and $HB_j$) associated to the same color channel of said video frames 400a + b |
| S4c | step #4c: calculating the differences between these color histograms |
| S5a | step #5a: for each selected video frame i calculating the differences d between the color histogram $H_i$ of the respectively selected video frame i and the color histograms $H_{i+\kappa}$ of all chronologically subsequent video frames i + κ until a distance k is found such that the difference between the selected video frame i and the corresponding subsequent video frame i + k exceeds a predefined redundancy threshold S(t) |
| S5b | step #5b: selecting this subsequent video frame i + k for the preview |
| S6a | step #6a: for each immediately chronologically adjacent pair of video frames. calculating differences d(i + κ, i + κ + 1) in the color histogram $H_i$ of the respectively selected video frame i and the color histograms $H_{i+\kappa}$ of the immediately chronologically adjacent video frame i + κ |
| S6b | step #6b: accumulating these differences until a chronologically subsequent video frame i + k is found for which the content of the respective difference image exceeds a predefined redundancy threshold S(t) |
| S6c | step #6c: selecting this subsequent video frame i + k for the preview |
| S7a | step #7a: defining an initial distance (n := $n_0$) between the selected video frame i and a new video frame j to be selected for the preview, said initial distance $n_0$ being an integer value greater than one |
| S7b | step #7b: in case the difference $d(i, j)|_{j=i+n}$ between these two video frames i and j falls below a predefined redundancy threshold S(t), multiplying said distance n with a constant integer factor l and defining (S7b') the obtained result n := n · l as a new distance between the selected video frame i and a new video frame j to be selected for the preview |
| S7c | step #7c: in case the difference $d(i, j)|_{j=i+n}$ between these two video frames i and j exceeds said redundancy threshold S(t), dividing said distance n by said factor l and defining (S7c') the obtained result n := n/l rounded down to the nearest integer as a new distance between the selected video frame i and a new video frame j to be selected for the preview |

-continued

| No. | Technical Feature (System Component, Procedure Step) |
|---|---|
| S7d | step #7d: iterating steps S7b and S7c until a minimum for said distance n is found such that said difference $d(i, j)|_{j-i+n}$ is the smallest difference exceeding said redundancy threshold S(t) among all differences compared with said threshold for a given initial distance $n_0$ |
| S7e | step #7e: in case said initial distance $n_0$ is an integer value greater than one, decrementing said initial value by one |
| S7f | step #7f: repeating steps S7b, S7c and S7d until a global minimum for said distance n is found such that said difference $d(i, j)|_{j-i+n}$ is the smallest difference exceeding said redundancy threshold S(t) among all differences compared with said threshold for all chosen initial distances $n_0$ |
| S201 | step #201: defining the first frame 0 as the active frame i (i := 0) |
| S202 | step #202: calculating the difference d(i, j) between the active frame i and its neighboring frame j := i + n |
| S202' | step #202': query whether said difference d(i, j) exceeds a predefined threshold S(t) |
| S203 | step #203: defining the present neighboring frame j as the new active frame i (i := j) |
| S204 | step #204: defining the next neighboring frame as the active frame (i := i + 1) |
| S205 | step #205: adjusting the threshold S(t) |

The invention claimed is:

1. A method, implemented on a display system having at least a display device, for previewing a video file on the display device by selecting video frames to be displayed for a preview, comprising:
    calculating, at the display system, differences between histograms associated with an active video frame and other frames of the video file, the calculating including determining the neighboring frame which is a frame with a difference between a histogram of the neighboring frame and a histogram of the active video frame that is closest to but greater than a predefined redundancy threshold than all the other frames, determining the neighboring frame being based on the differences previously calculated, the calculating including increasing a frame number of the next frame to be tested by a number greater than 1 when a difference between a histogram of a current frame being tested and the histogram of the active frame is less than the predefined redundancy threshold, and decreasing the frame number of the next frame to be tested when the difference between the histogram of the current frame being tested and the histogram of the active frame is greater than the predefined redundancy threshold;
    comparing, at the display system, at least one of the differences or a cumulative difference value representing a sum of the differences to the predefined redundancy threshold, the redundancy threshold being a time dependent variable;
    selecting, at the display system, particular video frames for the preview only when the at least one of said differences in the histograms of the particular video frames or said cumulative difference value exceeds the redundancy threshold so as to remove the redundancy of video frame content;
    adapting, at the display system, said redundancy threshold to change a speed of browsing of the preview so that fast changing content is previewed slowly with more video frames selected per unit of time in comparison to slow changing content, and slow changing content is previewed fast with fewer video frames selected per unit of time in comparison to fast changing content; and
    displaying the particular video frames for the preview on the display device.

2. The method according to claim 1, wherein said histograms associated with said subsequent video frames are calculated based on at least one of a color spectrum, audio spectrum, spatial configuration of pixels, parameters related to moving objects, or parameters related to motion of complete scenes of the video frames.

3. The method according to claim 1, further comprising:
    associating meta data to said video files, configured to identify parts of video files to be previewed; and
    synchronizing said meta data with said video files.

4. The method according to claim 1, further comprising:
    converting color histograms of said histograms to a gray scale histogram or to an adequate subset of colors included in said video frames before said calculating differences.

5. The method according to claim 1, wherein the histograms are spatial color histograms that are pre-calculated, the step of calculating differences further comprising:
    segmenting video frames to be compared into a certain number of regions;
    assigning an index to each region;
    calculating color histograms for at least some of the regions;
    pairwise comparing regions having a same index of the frames that are to be compared; and
    calculating differences between the color histograms of the regions having the same index.

6. The method according to claim 5, wherein the difference between two frames to be compared is calculated as an accumulated difference of all regions that are included in the two frames.

7. The method according to claim 5, further comprising:
    calculating a minimal or a maximal difference of the differences of all regions that are included in the subsequent video frames, before said comparing; and
    comparing the minimal or the maximal difference in said comparing.

8. The method according to claim 5, further comprising:
    calculating an arithmetic mean of the difference of all regions that are in the subsequent video frames, before said comparing; and
    comparing the arithmetic mean in said comparing.

9. The method according to claim 1, wherein the histograms are spatial color histograms that are pre-calculated, and the step of calculating differences further comprises:
    separately calculating color histograms for each color channel of the video frames to be compared;
    pairwise comparing color histograms associated to a same color channel of said video frames; and
    calculating differences between the color histograms of the same color channel.

10. The method according to claim 1, wherein
    the histograms are spatial color histograms that are pre-calculated, and
    the pre-calculated spatial color histograms are based on the subsequent video frames that are immediately chronologically adjacent pairs of video frames included in said video file.

11. The method according to claim 1, wherein
    the histograms are spatial color histograms that are pre-calculated, and the pre-calculated spatial color histograms are based on the subsequent video frames that are video frames with a distance of more than one video frame included in said video file.

12. The method according to claim 1, further comprising:
calculating differences between a color histogram of one of the selected video frames of said selecting and color histograms of all chronologically subsequent video frames, until a distance is found such that a difference between the one of the selected video frame and a corresponding subsequent video frame exceeds the predefined redundancy threshold, for each selected video frame; and
selecting the subsequent video frame that exceeded the predefined redundancy threshold for the preview.

13. The method according to claim 1, further comprising:
calculating differences between color histograms of the selected video frames of said selecting, and color histograms of the immediately chronologically adjacent video frame, for each immediately chronologically adjacent pair of video frames;
accumulating the differences in the color histograms until a chronologically subsequent video frame is found for which a content of a respective difference image exceeds the predefined redundancy threshold; and
selecting the subsequent video that exceeded the predefined redundancy threshold frame for the preview.

14. A method, implemented on a display system having at least a display device, for previewing a video file by selecting video frames to be displayed for a preview, comprising:
calculating, at the display system, differences between histograms associated with subsequent video frames of the video file; and
comparing, at the display system, at least one of the differences or a cumulative difference value representing a sum of the differences to a predefined redundancy threshold, wherein
when the at least one of said differences in the histograms of particular video frames or said cumulative difference value exceeds the predefined redundancy threshold, selecting, at the display system, the particular video frames for the preview, and
the predefined redundancy threshold is a time-dependent variable that is adjusted depending on histogram differences of subsequent video frames, the method further comprising, defining, at the display system, an initial distance between the selected video frame of said selecting and a new video frame to be selected for the preview, the initial distance being an integer value greater than one;
when the difference between the selected video frame and the new video frame falls below the predefined redundancy threshold, multiplying, at the display system, said distance with a constant integer factor and defining a result of said multiplying as a new distance between the selected video frame and a new video frame to be selected for the preview;
when the difference between the selected video frame and the new video frame does not fall below the predefined redundancy threshold, dividing, at the display system, said distance by said constant integer factor and defining a result of said dividing rounded down to a nearest integer as a new distance between the selected video frame and a new video frame to be selected for the preview;
iterating, at the display system, at least one of said multiplying or dividing until a minimum for said distance is found such that said difference is a smallest difference exceeding said redundancy threshold among all differences compared with said predefined redundancy threshold for a given initial distance;
when said initial distance is an integer value greater than one, decrementing, at the display system, said initial value by one; and
repeating, at the display system, at least one of said multiplying, dividing, or iterating until a global minimum for said distance is found such that said difference is the smallest difference exceeding said redundancy threshold among all differences compared with said predefined redundancy threshold for all chosen initial distances.

15. The method according to claim 1, wherein the histograms are pre-calculated, and at least one of said differences or predefined redundancy thresholds are temporarily stored in a database of a multimedia server.

16. The method according to claim 1, wherein in said step of displaying the particular video frames, more video frames per unit time are displayed for fast changing content compared to video frames of slow changing content, to decrease the speed of browsing when fast changing content is displayed.

* * * * *